US012776237B2

(12) United States Patent
Xie et al.

(10) Patent No.: US 12,776,237 B2
(45) Date of Patent: Oct. 27, 2026

(54) MULTIPLEXER CIRCUIT, MULTIPLEXING MODULE, DISPLAY DEVICE AND DRIVING METHOD

(71) Applicants: HEFEI XINSHENG OPTOELECTRONICS TECHNOLOGY CO., LTD., Hefei (CN); BOE TECHNOLOGY GROUP CO., LTD., Beijing (CN); Beijing BOE Technology Development Co., Ltd., Beijing (CN)

(72) Inventors: Yongxian Xie, Beijing (CN); Xiaoye Ma, Beijing (CN); Yongcan Wang, Beijing (CN); Ran Zhang, Beijing (CN); Zhangtao Wang, Beijing (CN); Hui Guo, Beijing (CN)

(73) Assignees: HEFEI XINSHENG OPTOELECTRONICS TECHNOLOGY CO., LTD., Hefei (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/881,899

(22) PCT Filed: May 23, 2024

(86) PCT No.: PCT/CN2024/094819
§ 371 (c)(1),
(2) Date: Jan. 7, 2025

(87) PCT Pub. No.: WO2025/001644
PCT Pub. Date: Jan. 2, 2025

(65) Prior Publication Data
US 2026/0011275 A1 Jan. 8, 2026

(30) Foreign Application Priority Data
Jun. 30, 2023 (CN) ........................ 202310812831.8

(51) Int. Cl.
*G09G 3/20* (2006.01)

(52) U.S. Cl.
CPC ....... *G09G 3/20* (2013.01); *G09G 2310/0275* (2013.01); *G09G 2310/0297* (2013.01)

(58) Field of Classification Search
CPC ...... G09G 3/20; G09G 3/3233; G09G 3/3275; G09G 3/3291; G09G 2310/0275; G09G 2310/0297
See application file for complete search history.

(56) References Cited

U.S. PATENT DOCUMENTS 9,767,725 B2 * 9/2017 Yang .................... G09G 3/3648
10,861,396 B2 * 12/2020 Zhao .................... H10K 59/353
(Continued)

FOREIGN PATENT DOCUMENTS

CN 105679272 A 6/2016
CN 108399900 A 8/2018
(Continued)

OTHER PUBLICATIONS

Office Action dated Feb. 7, 2026, issued in counterpart CN Application No. 202310812831.8, with English translation. (39 pages).
(Continued)

*Primary Examiner* — Vinh T Lam
(74) *Attorney, Agent, or Firm* — WHDA, LLP

(57) ABSTRACT

A multiplexer circuit, a multiplexing module, a display device and a driving method are provided. The multiplexer circuit is electrically coupled to M data voltage providing ends and a plurality of data lines. The multiplexer circuit includes N multiplexing control lines and N multiplexing circuits, an $n^{th}$ multiplexing circuit includes M multiplexing sub-circuits, and an $n^{th}$ multiplexing control line includes M control lines. An $m^{th}$ multiplexing sub-circuit included in an $n^{th}$ multiplexing circuit is electrically coupled to an $m^{th}$ (Continued)

control line in the $n^{th}$ multiplexing control line, an $m^{th}$ data voltage providing end and a corresponding data line, and configured to write a data voltage provided by the $m^{th}$ data voltage providing end into the corresponding data line under the control of a control signal provided by the $m^{th}$ control line.

20 Claims, 13 Drawing Sheets

(56) References Cited

U.S. PATENT DOCUMENTS

| | | | | |
|---|---|---|---|---|
| 10,943,525 | B2 * | 3/2021 | Chen | G09G 3/3688 |
| 11,114,008 | B2 * | 9/2021 | Jang | G09G 3/2085 |
| 12,062,341 | B2 * | 8/2024 | Ota | G09G 3/3233 |
| 12,254,817 | B2 * | 3/2025 | Dai | G09G 3/32 |
| 2004/0164941 | A1 * | 8/2004 | Kim | G09G 3/3688 345/87 |
| 2005/0024316 | A1 * | 2/2005 | Ohta | G09G 3/3688 345/100 |
| 2006/0250332 | A1 * | 11/2006 | Lo | G09G 3/20 345/76 |
| 2014/0092076 | A1 * | 4/2014 | Lee | G09G 3/3291 345/212 |
| 2019/0096344 | A1 * | 3/2019 | Zuo | G09G 3/3688 |
| 2019/0147786 | A1 * | 5/2019 | Kim | G09G 3/20 345/690 |
| 2020/0335021 | A1 * | 10/2020 | Fu | G09G 3/20 |
| 2021/0201830 | A1 * | 7/2021 | Nam | G09G 3/3291 |
| 2021/0319748 | A1 * | 10/2021 | Chen | G09G 3/3233 |
| 2022/0230599 | A1 * | 7/2022 | Han | G09G 3/2074 |
| 2023/0066643 | A1 * | 3/2023 | Zhang | G09G 3/20 |
| 2023/0260450 | A1 * | 8/2023 | Zhang | G09G 3/32 345/55 |
| 2024/0192797 | A1 * | 6/2024 | Oh | G06F 3/04164 |
| 2024/0379047 | A1 * | 11/2024 | Watanabe | G09G 3/32 |

FOREIGN PATENT DOCUMENTS

| | | | |
|---|---|---|---|
| CN | 111028759 | A | 4/2020 |
| CN | 111968588 | A | 11/2020 |
| CN | 114170891 | A | 3/2022 |
| CN | 115863354 | A | 3/2023 |
| CN | 115938272 | A | 4/2023 |
| KR | 20200069551 | A | 6/2020 |
| KR | 20210085504 | A | 7/2021 |

OTHER PUBLICATIONS

Office Action dated May 29, 2026, issued in counterpart CN Application No. 202310812831.8, with English translation. (22 pages).

* cited by examiner

MULTIPLEXER CIRCUIT, MULTIPLEXING MODULE, DISPLAY DEVICE AND DRIVING METHOD

CROSS-REFERENCE TO RELATED APPLICATION

This application is the U.S. national phase of PCT Application No. PCT/CN2024/094819 filed on May 23, 2024, which claims a priority of the Chinese patent application No. 202310812831.8 filed on Jun. 30, 2023, which is incorporated herein by reference in its entirety.

TECHNICAL FIELD

The present disclosure relates to the field of display technology, in particular to a multiplexer circuit, a multiplexing module, a display device and a driving method.

BACKGROUND

In the related art, there are many data drivers in a display product, and the data driver is expensive, so currently the cost of the display product is relatively high.

SUMMARY

In one aspect, the present disclosure provides in some embodiments a multiplexer circuit, electrically coupled to M data voltage providing ends and a plurality of data lines, the multiplexer circuit including N multiplexing control lines and N multiplexing circuits, an $n^{th}$ multiplexing circuit including M multiplexing sub-circuits, and an $n^{th}$ multiplexing control line including M control lines. An $m^{th}$ multiplexing sub-circuit included in the $n^{th}$ multiplexing circuit is electrically coupled to an $m^{th}$ control line in the $n^{th}$ multiplexing control line, an $m^{th}$ data voltage providing end and a corresponding data line, and configured to write a data voltage provided by the $m^{th}$ data voltage providing end into the corresponding data line under the control of a control signal provided by the $m^{th}$ control line, where N and M are both integers greater than 1, n is a positive integer smaller than or equal to N, and m is a positive integer smaller than or equal to M.

In a possible embodiment of the present disclosure, the multiplexer circuit includes a first multiplexing control line, a second multiplexing control line, a first multiplexing circuit and a second multiplexing circuit; the first multiplexing control line includes a first control line and a second control line, and the second multiplexing control line includes a third control line and a fourth control line; the first multiplexing circuit includes a first multiplexing sub-circuit and a second multiplexing sub-circuit, and the second multiplexing circuit includes a third multiplexing sub-circuit and a fourth multiplexing sub-circuit; the first multiplexing sub-circuit is electrically coupled to the first control line, a first data voltage providing end and a first data line, and configured to write a data voltage provided by the first data voltage providing end into the first data line under the control of a first control signal provided by the first control line; the second multiplexing sub-circuit is electrically coupled to the second control line, a second data voltage providing end and a second data line, and configured to write a data voltage provided by the second data voltage providing end into the second data line under the control of a second control signal provided by the second control line; the third multiplexing sub-circuit is electrically coupled to the third control line, the first data voltage providing end and a third data line, and configured to write the data voltage provided by the first data voltage providing end into the third data line under the control of a third control signal provided by the third control line; and the fourth multiplexing sub-circuit is electrically coupled to the fourth control line, the second data voltage providing end and a fourth data line, and configured to write the data voltage provided by the second data voltage providing end into the fourth data line under the control of a fourth control signal provided by the fourth control line.

In a possible embodiment of the present disclosure, the first multiplexing sub-circuit includes a first transistor, and the second multiplexing sub-circuit includes a second transistor; a gate electrode of the first transistor is electrically coupled to the first control line, a first electrode of the first transistor is electrically coupled to the first data voltage providing end, and a second electrode of the first transistor is electrically coupled to the first data line; and a gate electrode of the second transistor is electrically coupled to the second control line, a first electrode of the second transistor is electrically coupled to the second data voltage providing end, and a second electrode of the second transistor is electrically coupled to the second data line.

In a possible embodiment of the present disclosure, the first transistor and the second transistor are n-type transistors, or the first transistor and the second transistor are p-type transistors.

In a possible embodiment of the present disclosure, the third multiplexing sub-circuit includes a third transistor, and the fourth multiplexing sub-circuit includes a fourth transistor; a gate electrode of the third transistor is electrically coupled to the third control line, a first electrode of the third transistor is electrically coupled to the first data voltage providing end, and a second electrode of the third transistor is electrically coupled to the third data line; and a gate electrode of the fourth transistor is electrically coupled to the fourth control line, a first electrode of the fourth transistor is electrically coupled to the second data voltage providing end, and a second electrode of the fourth transistor is electrically coupled to the fourth data line.

In a possible embodiment of the present disclosure, the third transistor and the fourth transistor are n-type transistors; or the third transistor and the fourth transistor are p-type transistors.

In another aspect, the present disclosure provides in some embodiments a multiplexing module including a plurality of the above-mentioned multiplexer circuits.

In yet another aspect, the present disclosure provides in some embodiments a display device, including a data driver, a plurality of data lines, and the above-mentioned multiplexing module. The data driver is configured to provide a data voltage to the multiplexing module through a data voltage providing end, and each of the data lines is configured to receive a data voltage provided by the multiplexing module.

In a possible embodiment of the present disclosure, the data driver provides a control signal for each control line through at least one corresponding output channel.

In a possible embodiment of the present disclosure, the display device includes a display panel, one data driver and a plurality of control lines, the data driver is arranged at a first side of the display panel, the plurality of control lines is arranged between the data driver and an active display region of the display panel, and the data driver is further configured to provide the control signal to be inputted into the control line.

In a possible embodiment of the present disclosure, the control line includes a first end and a second end, a first output channel of the data driver is electrically coupled to the first end, a second output channel of the data driver is electrically coupled to the second end, and the data driver is configured to provide the control signal to the first end through the first output channel, and provide the control signal to the second end through the second output channel.

In a possible embodiment of the present disclosure, the display device includes a display panel, at least two data drivers and a plurality of control lines, the data driver is arranged at a first side of the display panel, the plurality of control lines is arranged between the data driver and an active display region of the display panel, and the data driver is further configured to provide the control signal to be inputted into the control line.

In a possible embodiment of the present disclosure, the control line is electrically coupled to the at least two data drivers through at least three access points, and configured to receive the control signal provided by the data driver.

In a possible embodiment of the present disclosure, the display device includes a first data driver and a second data driver; a first output channel of the first data driver is electrically coupled to a first end of the control line, and a first output channel of the second data driver is electrically coupled to a second end of the control line; a second output channel of the first data driver and a second output channel of the second data driver are electrically coupled to an intermediate node of the control line; the first data driver is configured to provide the control signal for the control line through the first output channel and the second output channel; and the second data driver is configured to provide the control signal for the control line through the first output channel and the second output channel.

In a possible embodiment of the present disclosure, the display device further includes a plurality of gate lines and a plurality of pixel circuits arranged in rows and columns, and each of the pixel circuits is electrically coupled to a corresponding gate line and a corresponding data line, and configured to receive a data voltage provided by the corresponding data line under the control of a gate driving signal provided by the corresponding gate line.

In still yet another aspect, the present disclosure provides in some embodiments a driving method, for the above-mentioned display device, including: providing, by a data driver, a data voltage for a multiplexing module through a data voltage providing end; and receiving, by a data line, a data voltage provided by the multiplexing module.

In a possible embodiment of the present disclosure, the display device further includes a plurality of gate lines and two multiplexing control lines; in a case that a $(2a-1)^{th}$ gate line is enabled, a first multiplexing control line controls a corresponding multiplexing transistor to be turned on, and then a second multiplexing control line controls a corresponding multiplexing transistor to be turned on; and in a case that a $(2a)^{th}$ gate line is enabled, the second multiplexing control line controls the corresponding multiplexing transistor to be turned on, and then the first multiplexing control line controls the corresponding multiplexing transistor to be turned on, where a is a positive integer.

In a possible embodiment of the present disclosure, the display device further includes a plurality of gate lines and two multiplexing control lines; in a case that a $(2a-1)^{th}$ gate line is enabled, a second multiplexing control line controls a corresponding multiplexing transistor to be turned on, and then a first multiplexing control line controls a corresponding multiplexing transistor to be turned on; and in a case that a $(2a)^{th}$ gate line is enabled, the first multiplexing control line controls the corresponding multiplexing transistor to be turned on, and then the second multiplexing control line controls the corresponding multiplexing transistor to be turned on, where a is a positive integer.

DETAILED DESCRIPTION OF THE EMBODIMENTS

Figure 1:
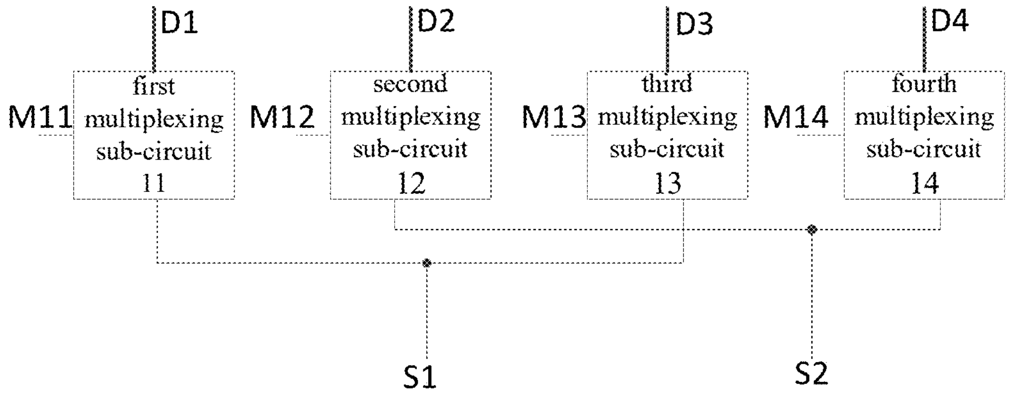
FIG. 1 is a block diagram of a multiplexer circuit according to at least one embodiment of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

All transistors adopted in the embodiments of the present disclosure may be thin film transistors, field effect transistors or any other elements having an identical characteristic. In the embodiments of the present disclosure, in order to differentiate two electrodes other than a gate electrode from each other, one of the two electrodes is called as first electrode and the other is called as second electrode.

In actual use, in a case that the transistor is a thin film transistor or a field effect transistor, the first electrode may be a drain electrode and the second electrode may be a source electrode, or the first electrode may be a source electrode and the second electrode may be a drain electrode.

The present disclosure provides in some embodiments a multiplexer circuit, which is electrically coupled to M data voltage providing ends and a plurality of data lines. The multiplexer circuit includes N multiplexing control lines and N multiplexing circuits, an $n^{th}$ multiplexing circuit includes M multiplexing sub-circuits, and an $n^{th}$ multiplexing control line includes M control lines. An $m^{th}$ multiplexing sub-circuit included in the $n^{th}$ multiplexing circuit is electrically coupled to an $m^{th}$ control line in the $n^{th}$ multiplexing control line, an $m^{th}$ data voltage providing end and a corresponding data line, and configured to write a data voltage provided by the $m^{th}$ data voltage providing end into the corresponding data line under the control of a control signal provided by the $m^{th}$ control line, where N and M are both integers greater than 1, n is a positive integer smaller than or equal to N, and m is a positive integer smaller than or equal to M.

In the related art, in a Touch and Display Driver Integration (TDDI) product, there are many data drivers, and the data driver is expensive, so the cost of the current TDDI product is relatively high. Based on this, the present disclosure provides in some embodiments a data signal multiplexer circuit, in which at least two data lines are driven using at least two multiplexing control lines and one data voltage providing end, so as to reduce the quantity of data voltage providing ends, thereby to reduce the quantity of the used data drivers while ensuring an unchanged resolution of the display product. In addition, in order to reduce a load of the multiplexing control line, the multiplexing control line is set as including at least two control lines, the at least two control lines are driven by different channels of the data driver, and the quantity of transistors drive by each control line is smaller than the quantity of transistors driven by the conventional multiplexing control line, so as to reduce the load of the control line, and effectively reduce a rising time and a falling time of a control signal on the control line, thereby to remarkably increase a charging capability of the control line.

In at least one embodiment of the present disclosure, for example, N and M are both equal to 2, but the present disclosure is not limited thereto. In actual use, each of N and M is an integer greater than 1.

In at least one embodiment of the present disclosure, the multiplexer circuit includes a first multiplexing control line, a second multiplexing control line, a first multiplexing circuit and a second multiplexing circuit. The first multiplexing control line includes a first control line and a second control line, and the second multiplexing control line includes a third control line and a fourth control line. The first multiplexing circuit includes a first multiplexing sub-circuit and a second multiplexing sub-circuit, and the second multiplexing circuit includes a third multiplexing sub-circuit and a fourth multiplexing sub-circuit. The first multiplexing sub-circuit is electrically coupled to the first control line, a first data voltage providing end and a first data line, and configured to write a data voltage provided by the first data voltage providing end into the first data line under the control of a first control signal provided by the first control line. The second multiplexing sub-circuit is electrically coupled to the second control line, a second data voltage providing end and a second data line, and configured to write a data voltage provided by the second data voltage providing end into the second data line under the control of a second control signal provided by the second control line. The third multiplexing sub-circuit is electrically coupled to the third control line, the first data voltage providing end and a third data line, and configured to write the data voltage provided by the first data voltage providing end into the third data line under the control of a third control signal provided by the third control line. The fourth multiplexing sub-circuit is electrically coupled to the fourth control line, the second data voltage providing end and a fourth data line, and configured to write the data voltage provided by the second data voltage providing end into the fourth data line under the control of a fourth control signal provided by the fourth control line.

During the implementation, the multiplexer circuit includes the first multiplexing control line, the second multiplexing control line, the first multiplexing circuit and the second multiplexing circuit. The first multiplexing control line includes the first control line and the second control line, and the second multiplexing control line includes the third control line and the fourth control line. The first multiplexing sub-circuit writes the data voltage provided by the first data voltage providing end into the first data line under the control of the first control signal. The second multiplexing sub-circuit writes the data voltage provided by the second data voltage providing end into the second data line under the control of the second control signal. The third multiplexing sub-circuit writes the data voltage provided by the first data voltage providing end into the third data line under the control of the third control signal. The fourth multiplexing sub-circuit writes the data voltage provided by the second data voltage providing end into the fourth data line under the control of the fourth control signal.

As shown in FIG. 1, in at least one embodiment of the present disclosure, the multiplexer circuit is electrically coupled to a first data voltage providing end S1, a second data voltage providing end S2, a first data line D1, a second data line D2, a third data line D3 and a fourth data line D4. The multiplexer circuit includes a first multiplexing control line, a second multiplexing control line, a first multiplexing circuit and a second multiplexing circuit.

The first multiplexing control line includes a first control line M11 and a second control line M12, and the second multiplexing control line includes a third control line M13 and a fourth control line M14.

The first multiplexing circuit includes a first multiplexing sub-circuit 11 and a second multiplexing sub-circuit 12, and the second multiplexing circuit includes a third multiplexing sub-circuit 13 and a fourth multiplexing sub-circuit 14.

The first multiplexing sub-circuit 11 is electrically coupled to the first control line M11, the first data voltage providing end S1 and the first data line D1, and configured to write a data voltage provided by the first data voltage providing end S1 into the first data line D1 under the control of a first control signal provided by the first control line M11.

The second multiplexing sub-circuit 12 is electrically coupled to the second control line M12, the second data voltage providing end S2 and the second data line D2, and configured to write a data voltage provided by the second data voltage providing end S2 into the second data line D2 under the control of a second control signal provided by the second control line M12.

The third multiplexing sub-circuit 13 is electrically coupled to the third control line M13, the first data voltage providing end S1 and the third data line D3, and configured to write the data voltage provided by the first data voltage providing end S1 into the third data line D3 under the control of a third control signal provided by the third control line M13.

The fourth multiplexing sub-circuit 14 is electrically coupled to the fourth control line M13, the second data voltage providing end S2 and the fourth data line D4, and configured to write the data voltage provided by the second data voltage providing end S2 into the fourth data line D4 under the control of a fourth control signal provided by the fourth control line M14.

During the operation of the multiplexer circuit in FIG. 1, the first control signal provided by the first control line M11 and the second control signal provided by the second control line M12 may be the same, and the third control signal provided by the third control line M13 and the fourth control signal provided by the fourth control line M14 may be the same. The first control line M11, the second control line M12, the third control line M13 and the fourth control line M14 are electrically coupled to a first output channel, a second output channel, a third output channel and a fourth output channel of the data driver respectively, and the control signal is provided for each control line through the corresponding output channel of the data driver. In this way, the quantity of transistors driven by each control line is reduced by half as compared with the quantity of transistors driven by a conventional multiplexing control line, and a load of the control line is reduced, so it is able to effectively reduce a rising time and a falling time of the control line on the control line, thereby to increase a charging capability of the control line.

In the multiplexer circuit as shown in FIG. 1, each control line is also electrically coupled to at least two output channels of the data driver, so as to increase a driving capability of the control line.

In a possible embodiment of the present disclosure, the first multiplexing sub-circuit includes a first transistor, and the second multiplexing sub-circuit includes a second transistor. A gate electrode of the first transistor is electrically coupled to the first control line, a first electrode of the first transistor is electrically coupled to the first data voltage providing end, and a second electrode of the first transistor is electrically coupled to the first data line. A gate electrode of the second transistor is electrically coupled to the second control line, a first electrode of the second transistor is electrically coupled to the second data voltage providing end, and a second electrode of the second transistor is electrically coupled to the second data line.

In a possible embodiment of the present disclosure, the first transistor and the second transistor are n-type transistors, or the first transistor and the second transistor are p-type transistors.

In a possible embodiment of the present disclosure, the third multiplexing sub-circuit includes a third transistor, and the fourth multiplexing sub-circuit includes a fourth transistor. A gate electrode of the third transistor is electrically coupled to the third control line, a first electrode of the third transistor is electrically coupled to the first data voltage providing end, and a second electrode of the third transistor is electrically coupled to the third data line. A gate electrode of the fourth transistor is electrically coupled to the fourth control line, a first electrode of the fourth transistor is electrically coupled to the second data voltage providing end, and a second electrode of the fourth transistor is electrically coupled to the fourth data line.

In a possible embodiment of the present disclosure, the third transistor and the fourth transistor are n-type transistors; or the third transistor and the fourth transistor are p-type transistors.

Figure 2:
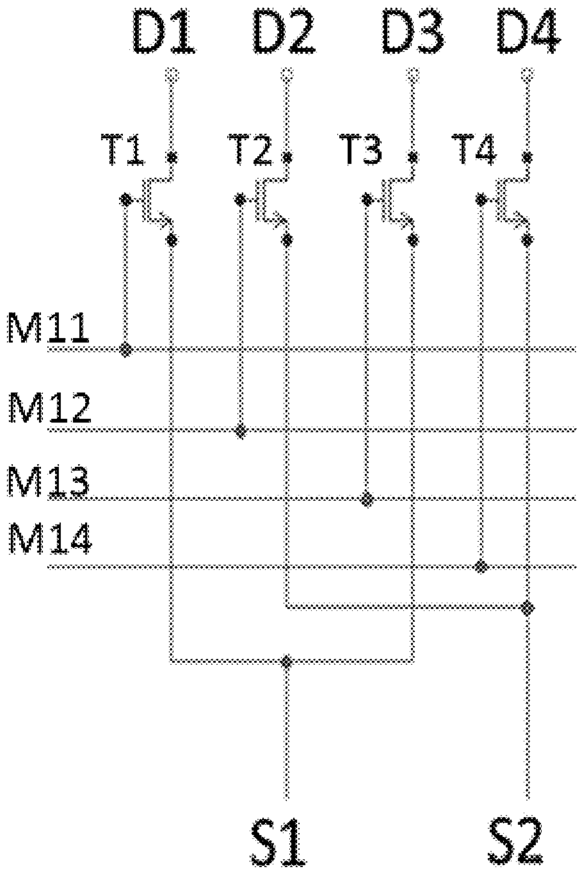
FIG. 2 is a circuit diagram of the multiplexer circuit according to at least one embodiment of the present disclosure.

As shown in FIG. 2, based on the multiplexer circuit in FIG. 1, the first multiplexing sub-circuit includes a first transistor T1, and the second multiplexing sub-circuit includes a second transistor T2. A gate electrode of the first transistor T1 is electrically coupled to the first control line M11, a source electrode of the first transistor T1 is electrically coupled to the first data voltage providing end S1, and a drain electrode of the first transistor T1 is electrically coupled to the first data line D1. A gate electrode of the second transistor T2 is electrically coupled to the second control line M12, a source electrode of the second transistor T2 is electrically coupled to the second data voltage providing end S2, and a drain electrode of the second transistor T2 is electrically coupled to the second data line D2.

The third multiplexing sub-circuit includes a third transistor T3, and the fourth multiplexing sub-circuit includes a fourth transistor T4. A gate electrode of the third transistor T3 is electrically coupled to the third control line M13, a source electrode of the third transistor T3 is electrically coupled to the first data voltage providing end S1, and a drain electrode of the third transistor T3 is electrically coupled to the third data line D3. A gate electrode of the fourth transistor T4 is electrically coupled to the fourth control line M14, a source electrode of the fourth transistor T4 is electrically coupled to the second data voltage providing end S2, and a drain electrode of the fourth transistor T4 is electrically coupled to the fourth data line D4.

In the multiplexer circuit in FIG. 2, all the transistors are, but not limited to, n-type transistors.

During the operation of the multiplexer circuit in FIG. 2, a data providing period includes a first multiplexing stage and a second multiplexing stage. At the first multiplexing stage, M11 and M12 both provide a high voltage signal, so T1 and T2 are turned on, S1 is electrically coupled to D1, and S2 is electrically coupled to D2. A data voltage is provided to D1 through S1, and a data voltage is provided to D2 through S2. At the second multiplexing stage, M13 and M14 both provide a high voltage signal, so T3 and T4 are turned on, S1 is electrically coupled to D3, and S2 is electrically coupled to D4. A data voltage is applied to D3 through S1, and a data voltage is applied to D4 through S2.

The present disclosure further provides in some embodiments a multiplexing module, which includes a plurality of the above-mentioned multiplexer circuits.

Figure 3A:
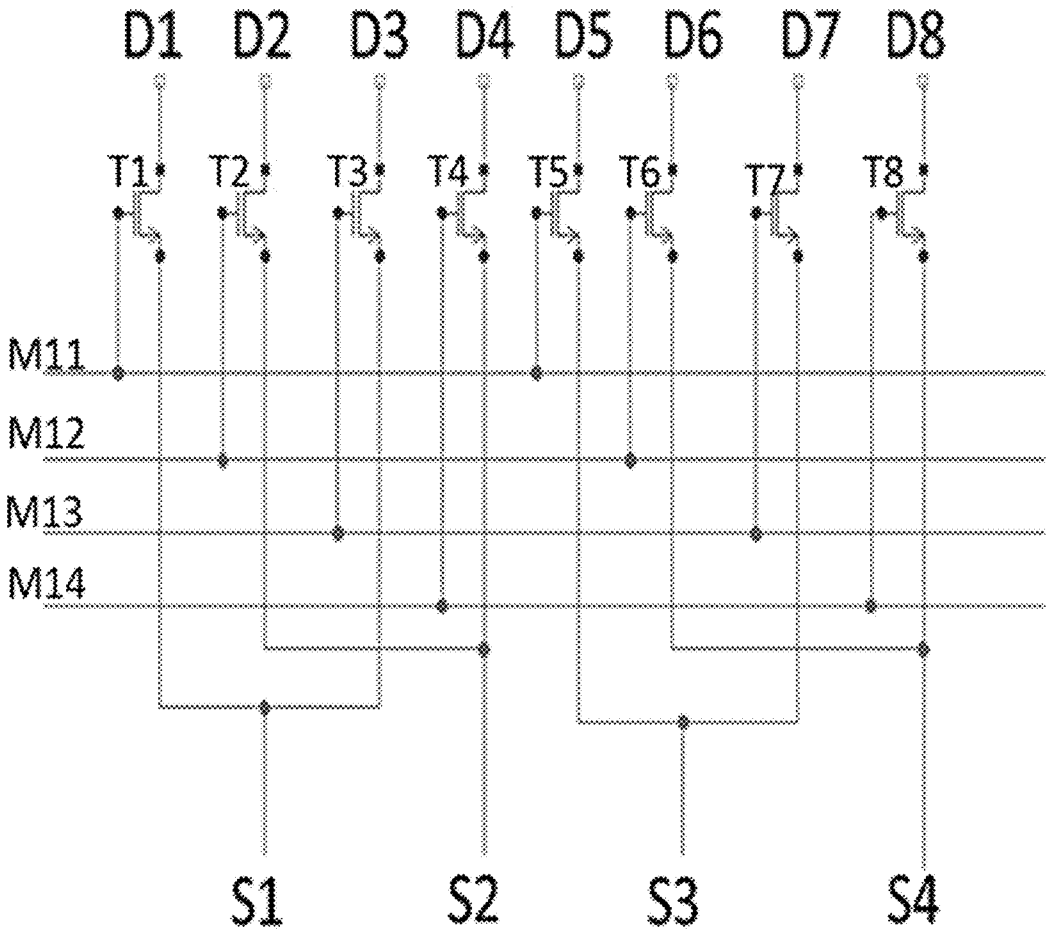
FIG. 3A is a schematic view showing a part of transistors included in a multiplexing module according to at least one embodiment of the present disclosure.

FIG. 3A is a schematic view showing a part of transistors included in the multiplexing muddle according to at least one embodiment of the present disclosure.

As shown in FIG. 3A, in at least one embodiment of the present disclosure, the multiplexing module includes a first multiplexer circuit and a second multiplexer circuit. The first multiplexer circuit includes a first transistor T1, a second transistor T2, a third transistor T3 and a fourth transistor T4, and the second multiplexer circuit includes a fifth transistor T5, a sixth transistor T6, a seventh transistor T7 and an eighth transistor T8.

A gate electrode of the first transistor T1 is electrically coupled to a first control line M11, a source electrode of the first transistor T1 is electrically coupled to a first data voltage providing end S1, and a drain electrode of the first transistor T1 is electrically coupled to a first data line D1.

A gate electrode of the second transistor T2 is electrically coupled to a second control line M12, a source electrode of the second transistor T2 is electrically coupled to a second data voltage providing end S2, and a drain electrode of the second transistor T2 is electrically coupled to a second data line D2.

A gate electrode of the third transistor T3 is electrically coupled to a third control line M13, a source electrode of the third transistor T3 is electrically coupled to the first data voltage providing end S1, and a drain electrode of the third transistor T3 is electrically coupled to a third data line D3.

A gate electrode of the fourth transistor is electrically coupled to a fourth control line M14, a source electrode of the fourth transistor T4 is electrically coupled to the second data providing end S2, and a drain electrode of the fourth transistor T4 is electrically coupled to a fourth data line D4.

A gate electrode of the fifth transistor T5 is electrically coupled to the first control line M11, a source electrode of the fifth transistor T5 is electrically coupled to a third data voltage providing end S3, and a drain electrode of the fifth transistor T5 is electrically coupled to a fifth data line D5.

A gate electrode of the sixth transistor T6 is electrically coupled to the second control line M12, a source electrode of the sixth transistor T6 is electrically coupled to a fourth data providing end S4, and a drain electrode of the sixth transistor T6 is electrically coupled to a sixth data line D6.

A gate electrode of the seventh transistor T7 is electrically coupled to the third control line M13, a source electrode of the seventh transistor T7 is electrically coupled to the third data voltage providing end S3, and a drain electrode of the seventh transistor T7 is electrically coupled to a seventh data line D7.

A gate electrode of the eighth transistor T8 is electrically coupled to the fourth control line M14, a source electrode of the eight transistor T8 is electrically coupled to the fourth data voltage providing end S4, and a drain electrode of the eighth transistor T8 is electrically coupled to an eighth data line D8.

In at least one embodiment as shown in FIG. 3A, T1, T2, T3, T4, T5, T6, T7 and T8 are all, but not limited to, n-type transistors.

During the operation of the multiplexing module in FIG. 3A, a data providing period includes a first multiplexing stage and a second multiplexing stage. At the first multiplexing stage, M11 and M12 both provide a high voltage signal, so T1, T2, T5 and T6 are turned on, S1 is electrically coupled to D1, and S2 is electrically coupled to D2. A data voltage is provided to D1 through S1, and a data voltage is provided to D2 through S2. S3 is electrically coupled to D5, and S4 is electrically coupled to D6. A data voltage is provided to D5 through S3, and a data voltage is provided to D6 through S4. At the second multiplexing stage, M13 and M14 both provide a high voltage signal, so T3, T4, T7 and T8 are turned on, S1 is electrically coupled to D3, and S2 is electrically coupled to D4. A data voltage is provided to D3 through S1, and a data voltage is provided to D4 through S2. S3 is electrically coupled to D7, and S4 is electrically coupled to D8. A data voltage is provided to D7 through S3, and a data voltage is provided to D8 through S4.

In at least one embodiment of the present disclosure, as shown in FIG. 3A, the quantity of the transistors is reduced by half, S1 drives D1 and D3, and S2 drives D2 and D4. In a case that S1 provides a positive data voltage, D1 and D3 provide a positive data voltage, and in a case that S2 provides a negative data voltage, D2 and D4 provide a negative data voltage, so that polarities of the data voltages on adjacent data lines in a pixel region are opposite to each other.

Figure 3B:
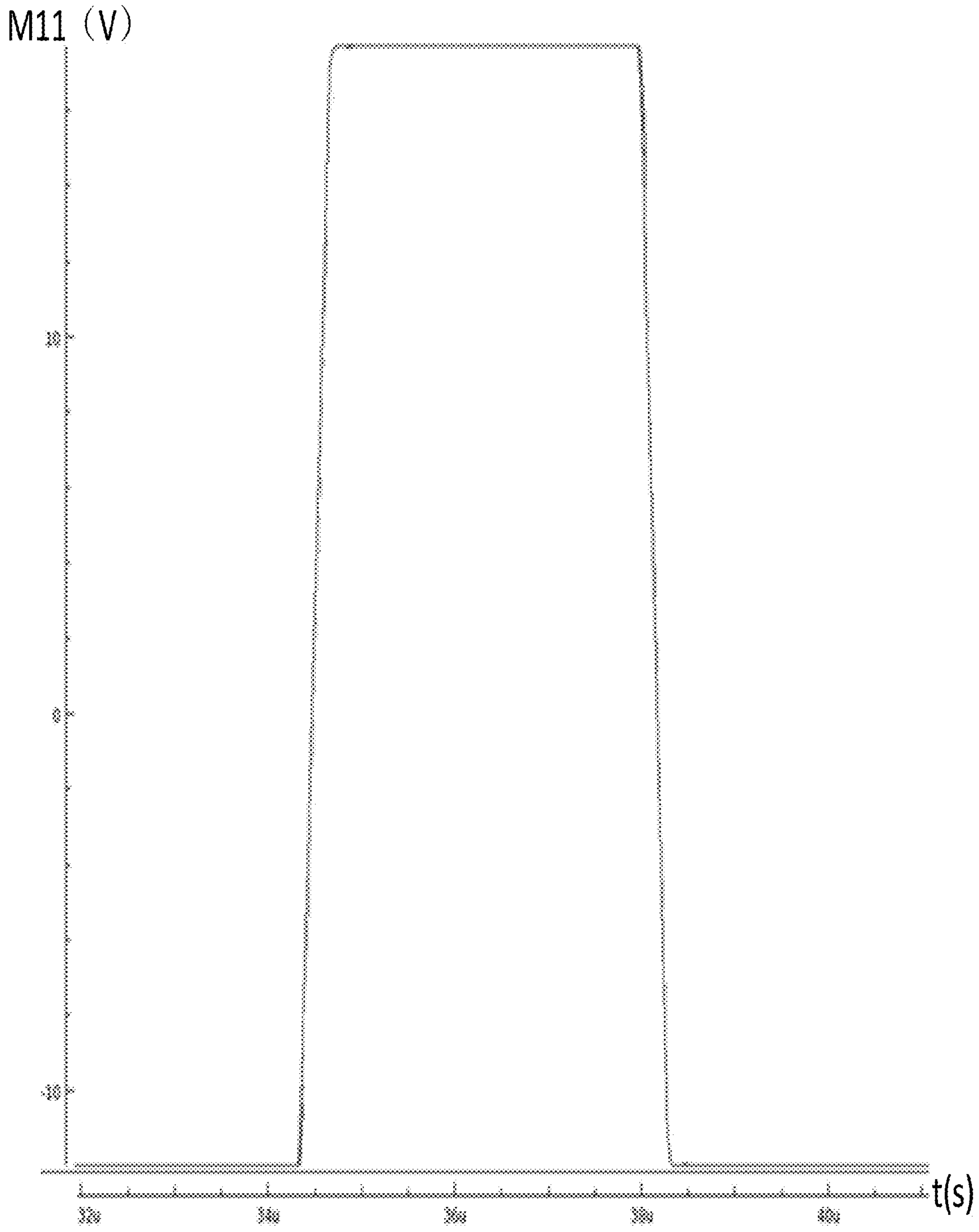
FIG. 3B is a waveform diagram of a first control signal provided by M11 according to at least one embodiment of the present disclosure.

FIG. 3B is a waveform diagram of a first control signal provided by M11 according to at least one embodiment of the present disclosure.

Figure 3C:
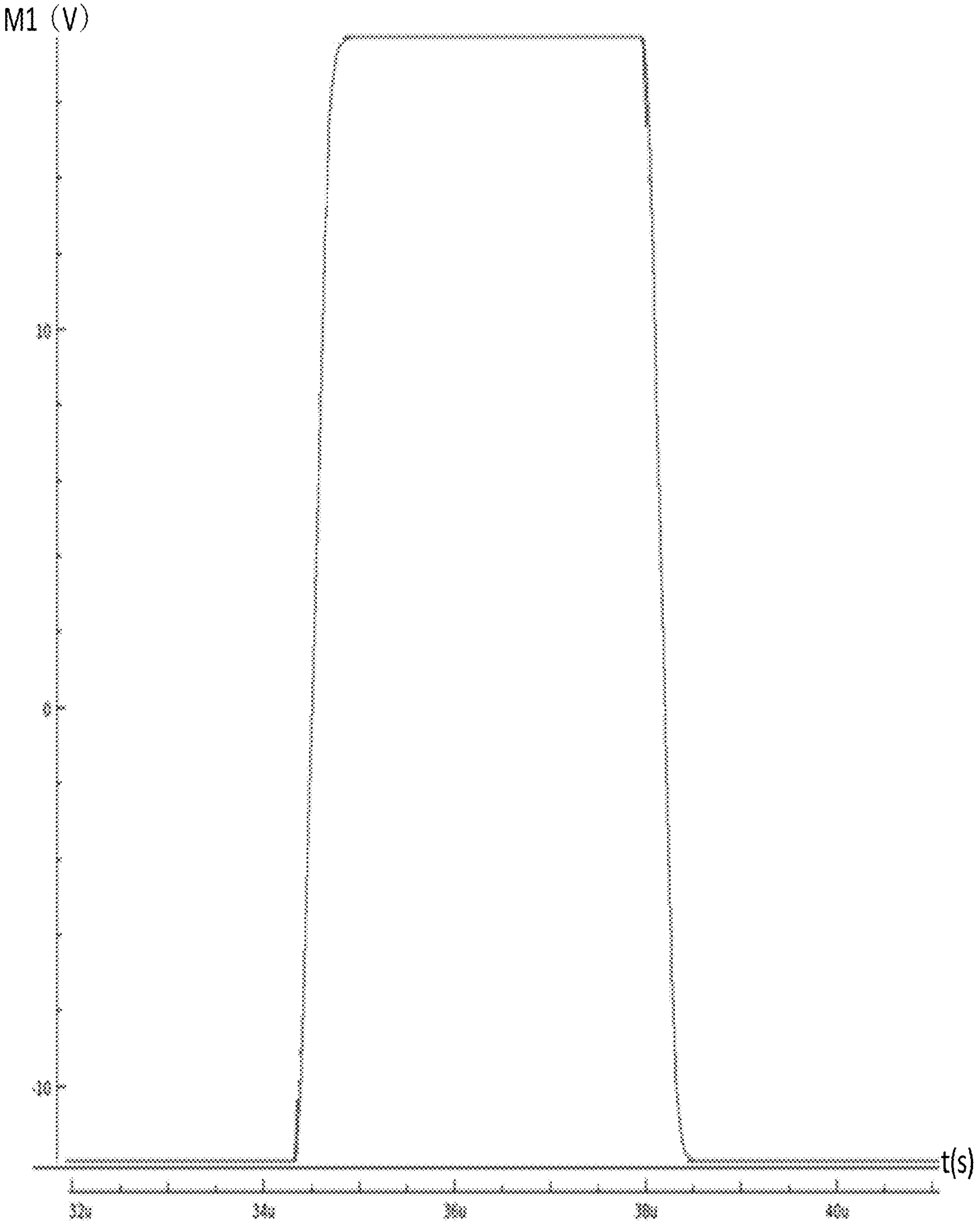
FIG. 3C is a waveform diagram of a multiplexing control signal provided by a multiplexing control line in the related art.

FIG. 3C is a waveform diagram of a multiplexing control signal provided by a multiplexing control line in the related art.

Through comparing FIG. 3B with FIG. 3C, the first control signal provided by M11 has a shorter rising time and a shorter falling time, and in the related art, the multiplexing control signal M1 provided by the multiplexing control line has a longer rising time and a longer falling time.

In at least one embodiment of the present disclosure, the rising time of the first control signal provided by M11 is 0.26 μs, and the falling time of the first control signal provided by M11 is 0.25 μs. In the related art, the rising time of the multiplexing control signal M1 is 0.46 μs, and the falling time of the multiplexing control signal M1 is 0.45 μs. Based on the above, in at least one embodiment of the present disclosure, the control signal is more beneficial for charging.

Figure 4:
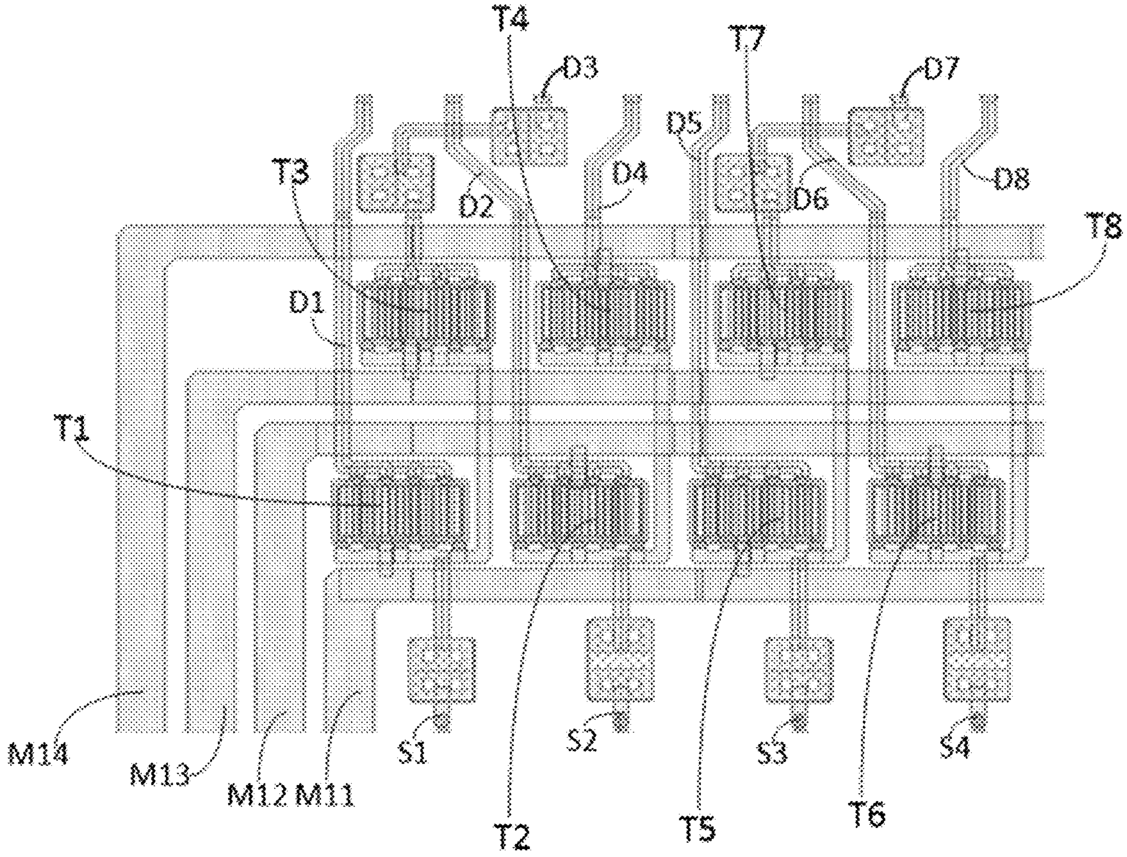
FIG. 4 is a schematic view showing the layout of the multiplexing module in FIG. 3A.

FIG. 4 is a schematic view showing the layout of the multiplexing module in FIG. 3A.

Figure 5:
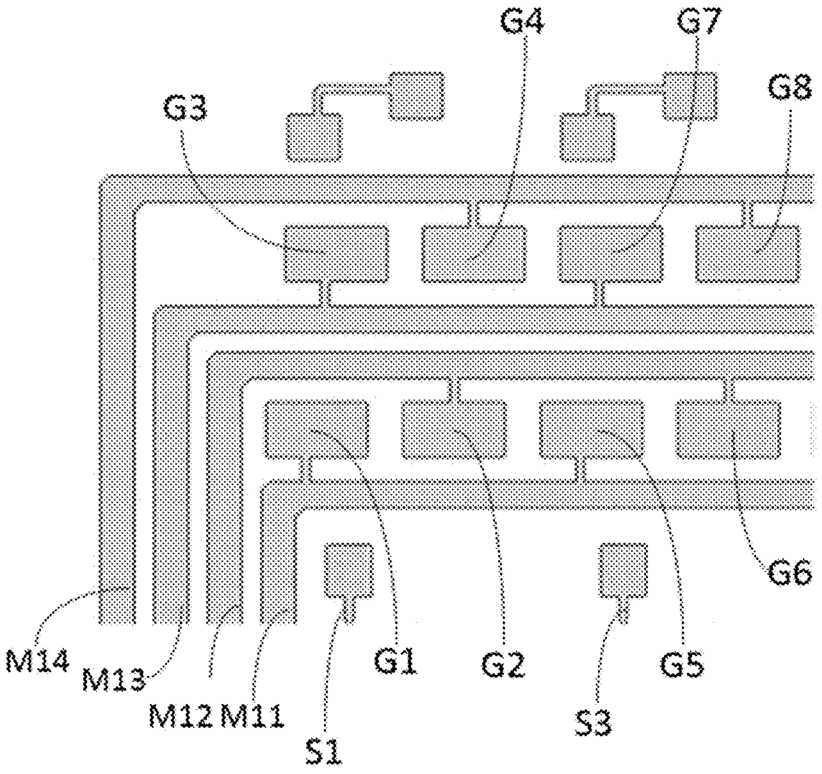
FIG. 5 is a schematic view showing the layout of a gate metal layer in FIG. 4.

FIG. 5 is a schematic view showing the layout of a gate metal layer in FIG. 4.

In FIG. 5, G1 represents the gate electrode of T1, G2 represents the gate electrode of T2, G3 represents the gate electrode of T3, G4 represents the gate electrode of T4, G5 represents the gate electrode of T5, G6 represents the gate electrode of T6, G7 represents the gate electrode of T7, and G8 represents the gate electrode of T8.

Figure 6:
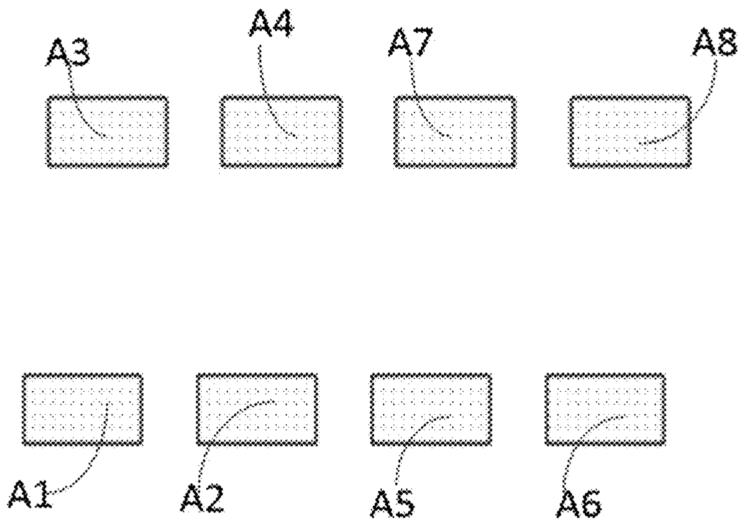
FIG. 6 is a schematic view showing the layout of a semiconductor layer in FIG. 4.

FIG. 6 is a schematic view showing the layout of a semiconductor layer in FIG. 4.

In FIG. 6, A1 represents an active pattern of T1, A2 represents an active pattern of T2, A3 represents an active pattern of T3, A4 represents an active pattern of T4, A5 represents an active pattern of T5, A6 represents an active pattern of T6, A7 represents an active pattern of T7, and A8 represents an active pattern of T8.

Figure 7:
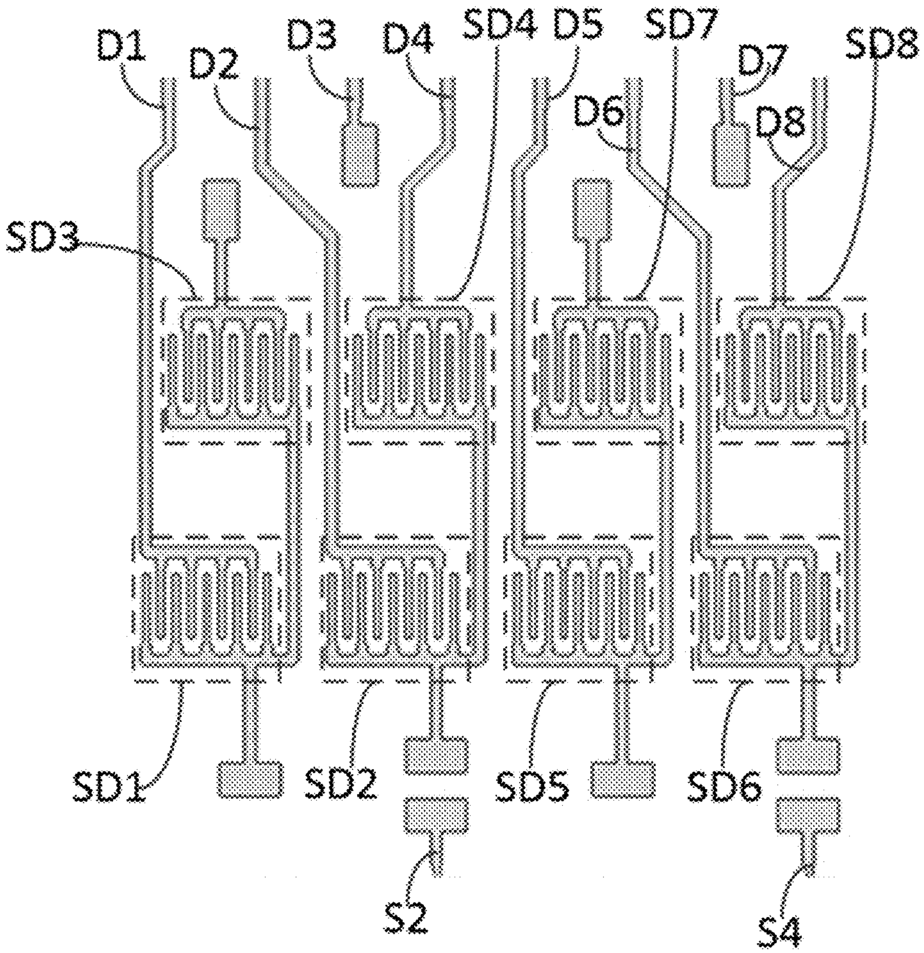
FIG. 7 is a schematic view showing the layout of a source/drain metal layer in FIG. 4.

FIG. 7 is a schematic view showing the layout of a source/drain metal layer in FIG. 4.

In FIG. 7, SD1 represents a source/drain electrode pattern of T1, SD2 represents a source/drain electrode pattern of T2, SD3 represents a source/drain electrode pattern of T3, SD4 represents a source/drain electrode pattern of T4, SD5 represents a source/drain electrode pattern of T5, SD6 represents a source/drain electrode pattern of T6, SD7 represents a source/drain electrode pattern of T7, and SD8 represents a source/drain electrode pattern of T8.

Figure 8:
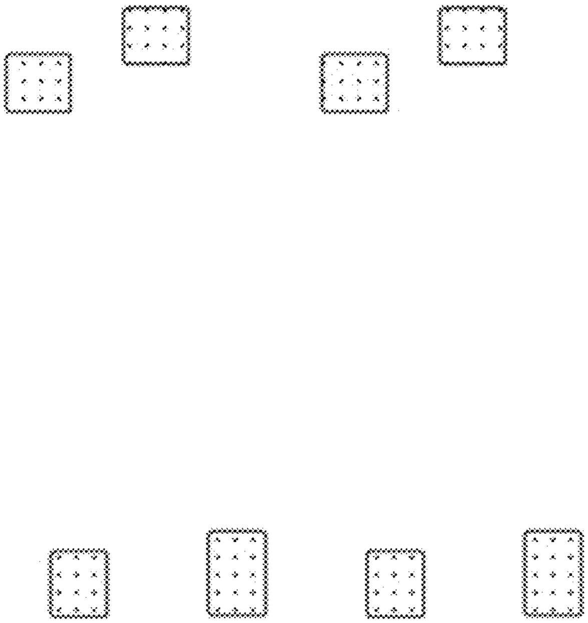
FIG. 8 is a schematic view showing the layout of a second conductive layer in FIG. 4.

FIG. 8 a schematic view showing the layout of a second conductive layer in FIG. 4.

In FIG. 4, the gate metal layer, the semiconductor layer, the source/drain metal layer and the second conductive layer are arranged sequentially in a direction away from a base substrate. A first conductive layer is arranged between the source/drain metal layer and the second conductive layer, and the first conductive layer is a common electrode layer formed as an entire layer. The second conductive layer is a pixel electrode layer. In a display region, the second conductive layer includes a pixel electrode, and the first conductive layer and the second conductive layer are made of, but not limited, Indium Tin Oxide (ITO).

In at least one embodiment of the present disclosure, a touch electrode layer is further arranged between the source/ drain metal layer and the first conductive layer, but the present disclosure is not limited thereto.

The present disclosure provides in some embodiments a display device, which includes a data driver, a plurality of data lines and the above-mentioned multiplexing module. The data driver is configured to provide a data voltage to the multiplexing module through a data voltage providing end, and each of the data lines is configured to receive a data voltage provided by the multiplexing module.

In the embodiments of the present disclosure, the display device includes the data driver and the above-mentioned multiplexing module, the data driver provides the data voltage to the multiplexing module through the data voltage providing end, and then the data voltage is provided to the corresponding data line.

In a possible embodiment of the present disclosure, the data driver provides a control signal for each control line through at least one corresponding output channel, so as to increase a driving capability of the control line.

In at least one embodiment of the present disclosure, the display device includes a display panel, one data driver and a plurality of control lines. The data driver is arranged at a first side of the display panel, the plurality of control lines is arranged between the data driver and an active display region of the display panel, and the data driver is further configured to provide the control signal to be inputted into the control line.

During the implementation, the display device includes only one data driver, the control line is arranged between the data driver and the active display region of the display panel, and the data driver provides the control signal to the control line.

In a possible embodiment of the present disclosure, the control line includes a first end and a second end. A first output channel of the data driver is electrically coupled to the first end, a second output channel of the data driver is electrically coupled to the second end, and the data driver is configured to provide the control signal to the first end through the first output channel, and provide the control signal to the second end through the second output channel.

During the implementation, in a case that the display device includes one data driver, the data driver is electrically coupled to the first end of the control line through one output channel and electrically coupled to the second end of the control line through another output channel, and provides the control signal to the control signal to the control line through the first end and the second end, so as to increase the driving capability of the control line.

In a possible embodiment of the present disclosure, in a case that a display panel is a display product having a resolution of 1200*2000, the display panel includes 2000 rows of pixel circuits and 3600 data lines. In a case that two data lines are driven by one data voltage providing end of the data driver, one data driver needs to be used. At this time, the data driver is electrically coupled to the first end of the control line through one output channel and electrically coupled to the second end of the control line through another output channel, so as to increase the driving capability of the control line.

Figure 9:
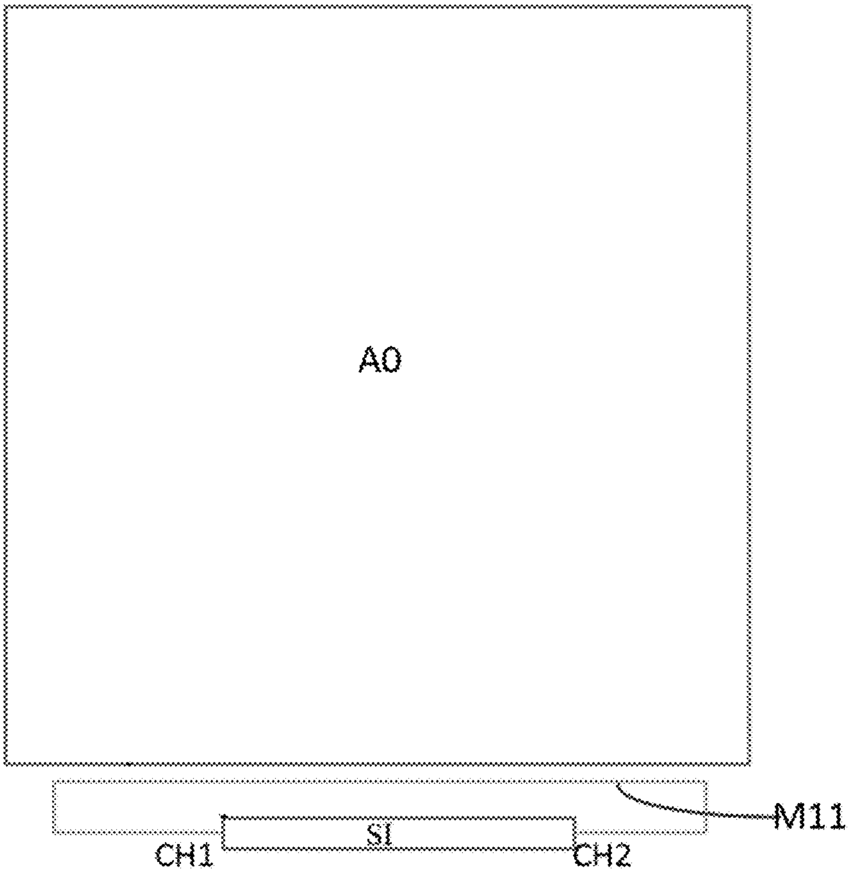
FIG. 9 is a schematic view showing a display device according to at least one embodiment of the present disclosure.

As shown in FIG. 9, A0 represents the active display region, S1 represents the data driver, and M11 represents a first control line. The data driver SI is arranged below A0, and the first control line M11 is arranged between the data driver SI and the active display region A0. The data driver SI is electrically coupled to a first end of the first control line M11 through a first output channel CH1 on the left, and the data driver SI is electrically coupled to a second end of the first control line M11 through a second output channel CH2 on the right, so as to drive the first control line M11 from the two ends simultaneously.

In at least one embodiment of the present disclosure, driving modes of the second control line M12, the third control line M13 and the fourth control line M14 are the same as that of the first control line M11, i.e., each control line is driven from two ends simultaneously.

In at least one embodiment of the present disclosure, the display device includes a display panel, at least two data drivers and a plurality of control lines, the data driver is arranged at a first side of the display panel, the plurality of control lines is arranged between the data driver and an active display region of the display panel, and the data driver is further configured to provide the control signal to be inputted into the control line.

During the implementation, in a case that the display device includes at least two data drivers, the control lines are arranged between the data drivers and the active display region of the display panel, and the data driver provides the control signal to be inputted into the control line.

In at least one embodiment of the present disclosure, the control line is electrically coupled to the at least two data drivers through at least three access points, and configured to receive the control signal provided by the data driver.

During the implementation, the control line is electrically coupled to the at least two data drivers through at least three access points to receive the control signal, so it is able to further increase the driving capability of the control line.

In a possible embodiment of the present disclosure, the display device includes a first data driver and a second data driver. A first output channel of the first data driver is electrically coupled to a first end of the control line, and a first output channel of the second data driver is electrically coupled to a second end of the control line. A second output channel of the first data driver and a second output channel of the second data driver are electrically coupled to an intermediate node of the control line. The first data driver is configured to provide the control signal for the control line through the first output channel and the second output channel. The second data driver is configured to provide the control signal for the control line through the first output channel and the second output channel.

During the implementation for a display panel having a resolution of 1840*2944, the display panel includes 1840 rows of pixel circuits and 8832 data lines. Driving architecture where two data lines are driven by one data voltage providing end is adopted, and the required quantity of data voltage providing ends is 4416. In a case that each data driver has 240 channels, two data drivers need to be adopted.

Figure 10:
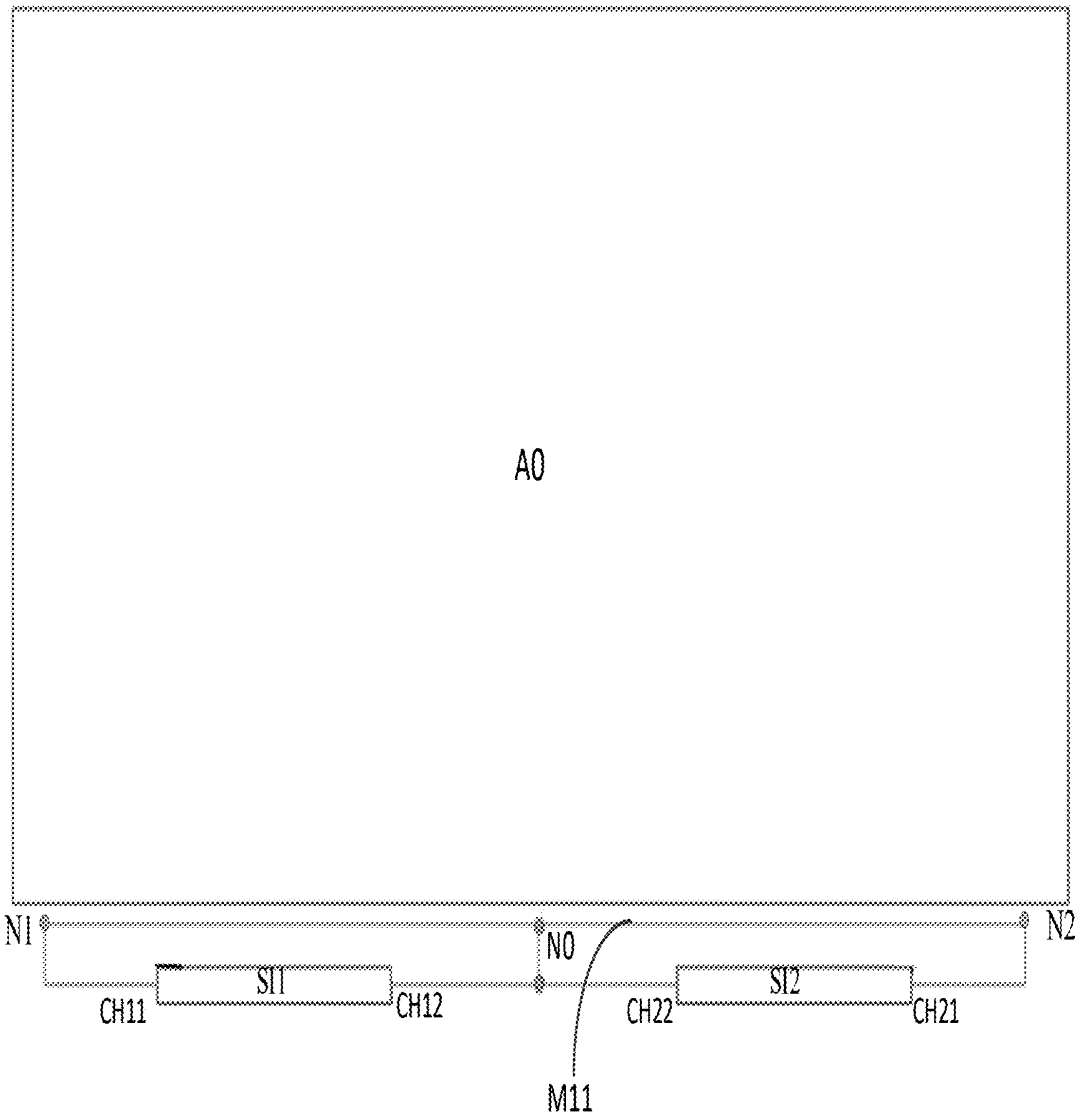
FIG. 10 is a schematic view showing the display device according to at least one embodiment of the present disclosure.

As shown in FIG. 10, A0 represents the active display region, SI1 represents the data driver, SI2 represents the second data driver, and M11 represents a first control line. The first control line M11 is arranged between the data drivers and the active display region A0. A first output channel CH11 of the first data driver SI1 is electrically coupled to a first end N1 of the first control line M11, and a first output channel CH21 of the second data driver SI2 is electrically coupled to a second end N2 of the first control line M11. A second output channel CH12 of the first data driver SI1 and a second output channel CH22 of the second data driver SI2 are both electrically coupled to an intermediate node NO of the control line. The first data driver SI1 provides a control signal for the first control line M11 through CH11 and CH12, and the second data driver SI2 provides a control signal for the first control line M11 through CH21 and CH22.

During the implementation, driving modes of the second control line M12, the third control line M13 and the fourth control line M14 are the same as that of the first control line M11, and each control line receives a driving signal at three positions, so it is able to further increase a driving capability of the control signal.

Figure 11:
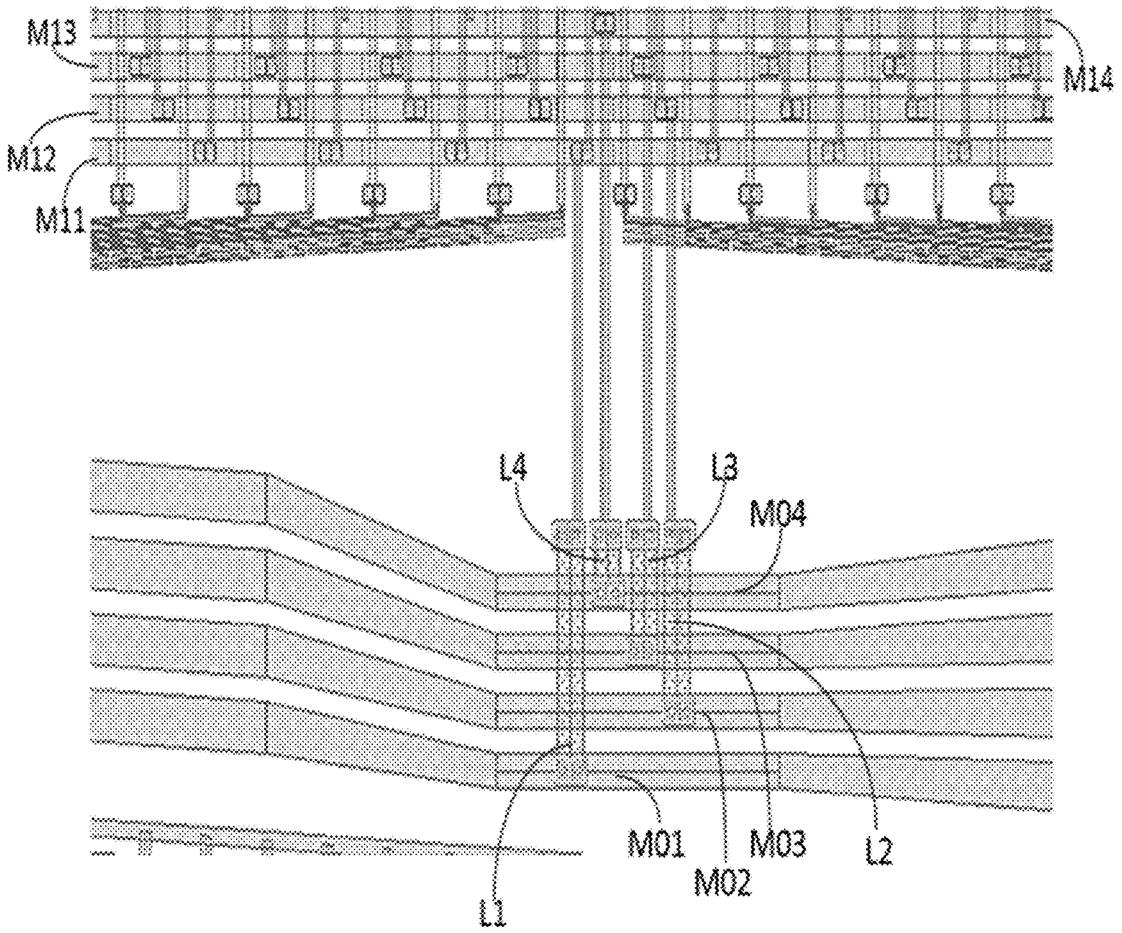
FIG. 11 is a schematic view showing the layout of a middle portion of the display device in FIG. 10.

FIG. 11 is a schematic view showing the layout of a middle portion in FIG. 10, i.e., showing a connection relationship between connection lines between two data drivers and intermediate nodes of the control lines.

In FIG. 11, M01 represents a first connection line between a first source driver and a second source driver, M02 represents a second connection line between the first source driver and the second source driver, M03 represents a third connection line between the first source driver and the second source driver, and M04 represents a fourth connection line between the first source driver and the second source driver. M01 is electrically coupled to M11 through a first connection member L1, M02 is electrically coupled to M12 through a second connection member L2, M03 is electrically coupled to M13 through a third connection member L3, and M04 is electrically coupled to M14 through a fourth connection member L4.

Figure 12:
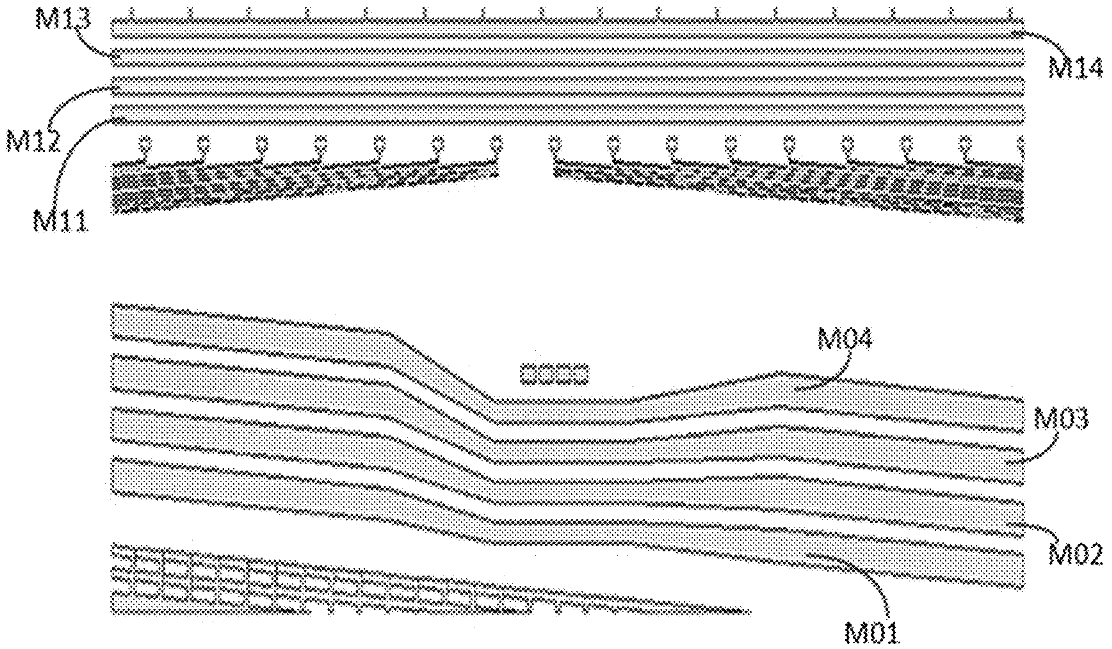
FIG. 12 is a schematic view showing the layout of the gate metal layer in FIG. 11.

FIG. 12 is a schematic view showing the layout of a gate metal layer in FIG. 11, and M01, M02, M03, M04, M11, M12, M13 and M14 are all formed at the gate metal layer.

Figure 13:
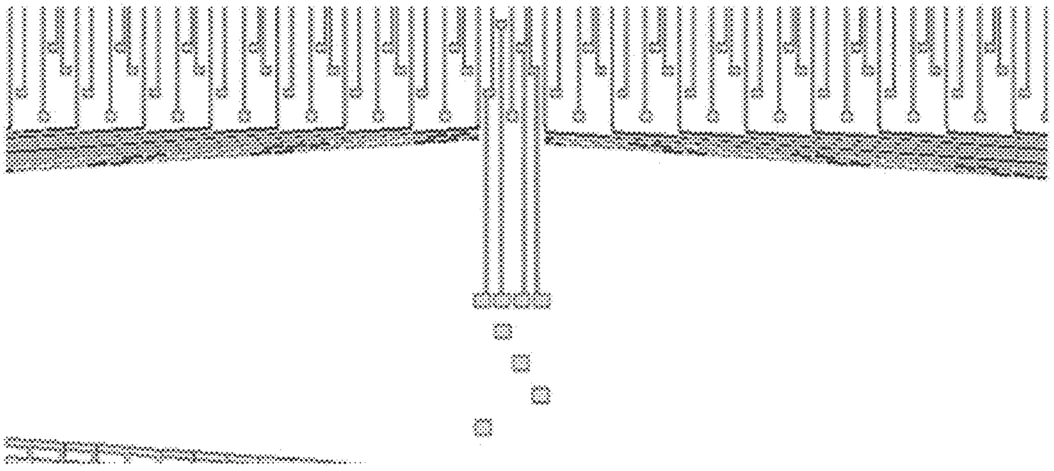
FIG. 13 is a schematic view showing the layout of the source/drain metal layer in FIG. 11.

FIG. 13 is a schematic view showing the layout of a source/drain metal layer in FIG. 11.

Figure 14:
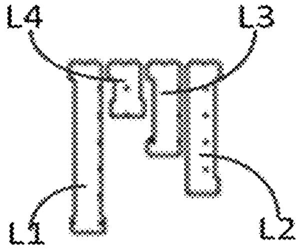
FIG. 14 is a schematic view showing the layout of a second conductive layer in FIG. 11.

FIG. 14 is a schematic view showing the layout of a second conductive layer in FIG. 11, and L1, L2, L3 and L4 are all formed at the second conductive layer.

In at least one embodiment of the present disclosure, the display device further includes a plurality of gate lines and a plurality of pixel circuits arranged in rows and columns, and each of the pixel circuits is electrically coupled to a corresponding gate line and a corresponding data line, and configured to receive a data voltage provided by the corresponding data line under the control of a gate driving signal provided by the corresponding gate line.

During the implementation, the display device includes the plurality of gate lines and the plurality of pixel circuits arranged in rows and columns, and each pixel circuit receives the data voltage provided by the data line under the control of the gate driving signal.

The display device in the embodiments of the present disclosure is, but not limited to, a TDDI product. In actual use, the display device may also be a display device of any other type.

The present disclosure provides in some embodiments a driving method for the above-mentioned display device, which includes: providing, by a data driver, a data voltage for a multiplexing module through a data voltage providing end; and receiving, by a data line, a data voltage provided by the multiplexing module.

In at least one embodiment of the present disclosure, the display device further includes a plurality of gate lines and two multiplexing control lines; in a case that a $(2a-1)^{th}$ gate line is enabled, a first multiplexing control line controls a corresponding multiplexing transistor to be turned on, and then a second multiplexing control line controls a corresponding multiplexing transistor to be turned on; and in a case that a $(2a)^{th}$ gate line is enabled, the second multiplexing control line controls the corresponding multiplexing transistor to be turned on, and then the first multiplexing control line controls the corresponding multiplexing transistor to be turned on, where a is a positive integer.

The first multiplexing control line includes a first control line and a second control line, the second multiplexing control line includes a third control line and a fourth control line, the first control line and the second control line control the respective multiplexing transistors, and the third control line and the fourth control line control the respective multiplexing transistors.

During the implementation, in a case that an odd-numbered gate line is enabled, the first multiplexing control line controls the corresponding multiplexing transistor to be turned on, and then the second multiplexing control line controls the corresponding multiplexing transistor to be turned on. In a case that an even-numbered gate line is enabled, the second multiplexing control line controls the corresponding multiplexing transistor to be turned on, and then the first multiplexing control line controls the corresponding multiplexing transistor to be turned on. In this way, the control signal on each multiplexing control line has a low frequency, and thereby the power consumption is small.

In at least one embodiment of the present disclosure, the display device further includes a plurality of gate lines and two multiplexing control lines; in a case that a $(2a-1)^{th}$ gate line is enabled, a second multiplexing control line controls a corresponding multiplexing transistor to be turned on, and then a first multiplexing control line controls a corresponding multiplexing transistor to be turned on; and in a case that a $(2a)^{th}$ gate line is enabled, the first multiplexing control line controls the corresponding multiplexing transistor to be turned on, and then the second multiplexing control line controls the corresponding multiplexing transistor to be turned on, where a is a positive integer.

The first multiplexing control line includes a first control line and a second control line, the second multiplexing control line includes a third control line and a fourth control line, the first control line and the second control line control the respective multiplexing transistors, and the third control line and the fourth control line control the respective multiplexing transistors.

During the implementation, in a case that an odd-numbered gate line is enabled, the second multiplexing control line controls the corresponding multiplexing transistor to be turned on, and then the first multiplexing control line controls the corresponding multiplexing transistor to be turned on. In a case that an even-numbered gate line is enabled, the first multiplexing control line controls the corresponding multiplexing transistor to be turned on, and then the second multiplexing control line controls the corresponding multiplexing transistor to be turned on. In this way, the control signal on each multiplexing control line has a low frequency, and thereby the power consumption is small.

Figure 15:
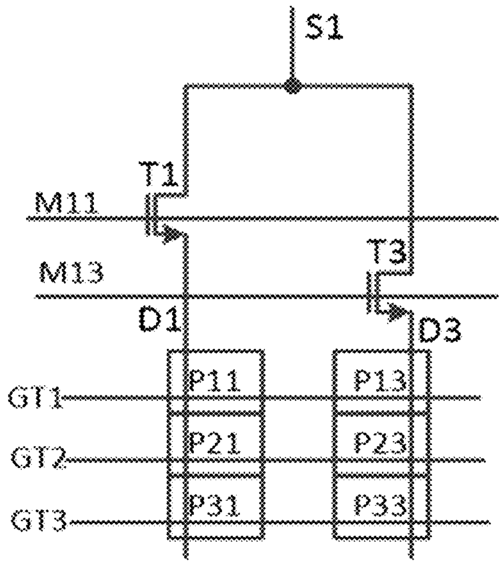
FIG. 15 is a schematic view showing a connection relationship between a part of pixel circuits and a part of multiplexing transistors included in the display device according to at least one embodiment of the present disclosure.

As shown in FIG. 15, the first control line M11 included in the first multiplexing control line controls a first transistor T1, and the third control line M13 included in the second multiplexing control line controls a third transistor T3. S1 represents a first data voltage providing end, P11 represents a pixel circuit in a first row and a first column, and P13 represents a pixel circuit in the first row and a third column. Both P11 and P13 are electrically coupled to a first gate line GT1, P11 is electrically coupled to a first data line D1, and P13 is electrically coupled to a third data line D3. P21 represents a pixel circuit in a second row and the first column, and P23 represents a pixel circuit in the second row and the third column. Both P21 and P23 are electrically coupled to a second gate line GT2, P21 is electrically coupled to the first data line D1, and P23 is electrically coupled to the third data line D3. P31 represents a pixel circuit in a third row and the first column, and P33 represents a pixel circuit in the third row and the third column. Both P31 and P33 are electrically coupled to a third gate line GT3, P31 is electrically coupled to the first data line D1, and P33 is electrically coupled to the third data line D3.

Figure 16:
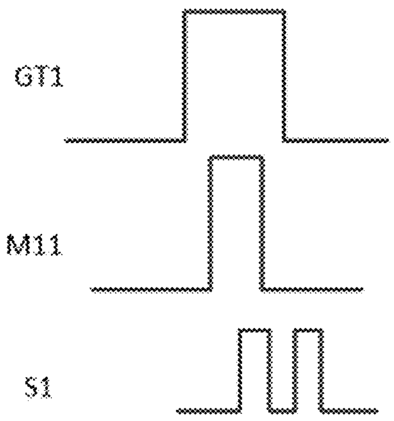
FIG. 16 is a sequence diagram of the display device in FIG. 15.

During the operation of the display device in FIG. 15, in a case of driving the pixel circuits in the first row, as shown in FIG. 16, a potential of a first gate driving signal outputted by GT1 increases from a low voltage to a high voltage, and then a control signal outputted by M11 increases from a low voltage to a high voltage, so T1 is turned on to write the data voltage provided by S1 into the first data line D1. In a case that the potential of the first gate driving signal is a high voltage, P11 receives the data voltage provided by D1.

Figure 17:
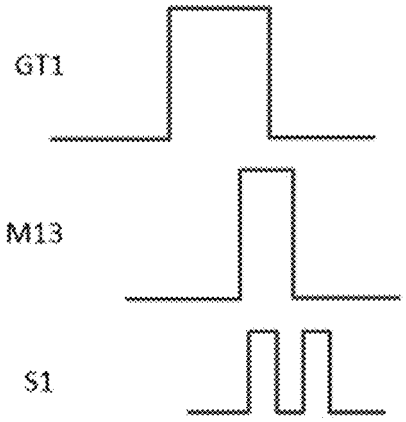
FIG. 17 is a sequence diagram of the display device in FIG. 15.

As shown in FIG. 17, the potential of the first gate driving signal outputted by GT1 increases from a low voltage to a high voltage, and then the control signal outputted by M13 increases from a low voltage to a high voltage, so T3 is turned on to write the data voltage provided by S1 into the third data line D3. In a case that the potential of the first gate driving signal is a high voltage, P13 receives the data voltage provided by D3. T1 and T3 are both n-type transistors.

Figure 18:
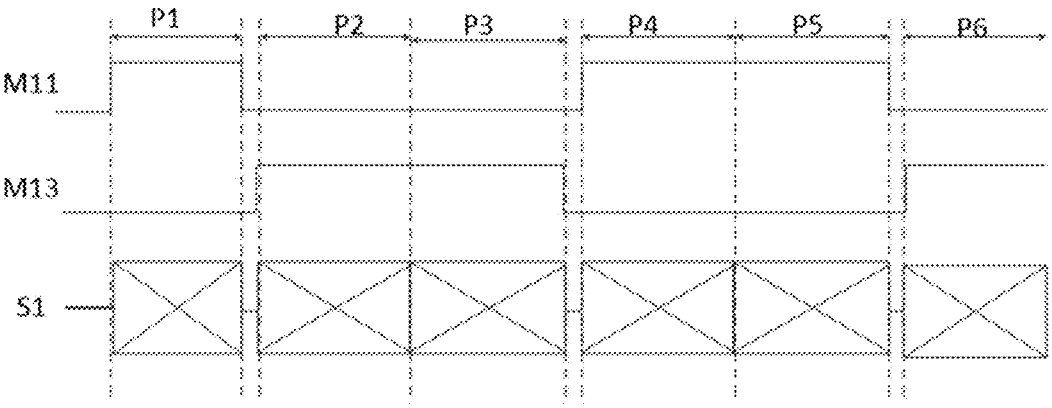
FIG. 18 is a sequence diagram of the display device in FIG. 15.

During the implementation, during the operation of the display device in FIG. 15, the driving is performed in a zigzag manner. To be specific, as shown in FIG. 18, GT1 is enabled; within a first time period P1, M11 outputs a high voltage signal to control T1 to be turned on and write the data voltage into P11; and within a second time period P2, M13 outputs a high voltage signal to control T3 to be turned on and write the data voltage into P13. Next, GT2 is enabled; within a third time period P3, M13 outputs a high voltage signal to control T3 to be turned on and write the data voltage into P23; and within a fourth time period P4, M11 outputs a high voltage signal to control T1 to be turned on and write the data voltage into P21. Then, GT3 is enabled; within a fifth time period P5, M11 outputs a high voltage signal to control T1 to be turned on and write the data voltage into P31; and within a sixth time period P6, M13 outputs a high voltage signal to control T3 to be turned on and write the data voltage into P33.

FIG. 18 is a sequence diagram of the display device in FIG. 15.

As shown in FIG. 18, the control signal provided by M11 and the control signal provided by M13 have a low frequency, so it is beneficial for reducing the power consumption.

In at least one embodiment of the present disclosure, a width-to-length ratio of each multiplexing transistor is, but not limited to, greater than or equal to 50 and smaller than or equal to 100.

The above are the preferred embodiments of the present disclosure. It should be appreciated that, improvements and modifications may be made by a person skilled in the art without departing from the principle of the present disclosure, and these improvements and modifications shall also fall within the scope of the present disclosure.

What is claimed is:

1. A display device, comprising a display panel, one data driver, a plurality of control lines, a plurality of data lines, and a multiplexing module, wherein;

the multiplexing module comprises a plurality of multiplexer circuits, the data driver is configured to provide a data voltage to the multiplexing module through a data voltage providing end, and each of the data lines is configured to receive a data voltage provided by the multiplexing module;

the data driver is arranged at a first side of the display panel, the plurality of control lines are arranged between the data driver and an active display region of the display panel;

the data driver is further configured to provide a control signal to be inputted into the control lines;

each control line comprises a first end and a second end; and a first output channel of the data driver is electrically coupled to the first end, a second output channel of the data driver is electrically coupled to the second end, and the data driver is configured to provide the control signal to the first end through the first output channel, and provide the control signal to the second end through the second output channel.

2. The display device according to claim 1, further comprising a plurality of gate lines and a plurality of pixel circuits arranged in rows and columns, wherein each of the pixel circuits is electrically coupled to a corresponding gate line and a corresponding data line, and configured to receive a data voltage provided by the corresponding data line under the control of a gate driving signal provided by the corresponding gate line.

3. A driving method, for a display device according to claim 1, comprising:

providing, by a data driver, a data voltage for a multiplexing module through a data voltage providing end; and receiving, by a data line, a data voltage provided by the multiplexing module.

4. The driving method according to claim 3, wherein the display device further comprises a plurality of gate lines and two multiplexing control lines;

in a case that a $(2a-1)^{th}$ gate line is enabled, a first multiplexing control line controls a corresponding multiplexing transistor to be turned on, and then a second multiplexing control line controls a corresponding multiplexing transistor to be turned on; and in a case that a $(2a)^{th}$ gate line is enabled, the second multiplexing control line controls the corresponding multiplexing transistor to be turned on, and then the first multiplexing control line controls the corresponding multiplexing transistor to be turned on, where a is a positive integer.

5. The driving method according to claim 3, wherein the display device further comprises a plurality of gate lines and two multiplexing control lines;

in a case that a $(2a-1)^{th}$ gate line is enabled, a second multiplexing control line controls a corresponding multiplexing transistor to be turned on, and then a first multiplexing control line controls a corresponding multiplexing transistor to be turned on; and in a case that a $(2a)^{th}$ gate line is enabled, the first multiplexing control line controls the corresponding multiplexing transistor to be turned on, and then the second multiplexing control line controls the corresponding multiplexing transistor to be turned on, where a is a positive integer.

6. The display device according to claim 1, wherein each multiplexer circuit is electrically coupled to M data voltage providing ends and a plurality of data lines, the multiplexer circuit comprises N multiplexing control lines and N multiplexing circuits, an $n^{th}$ multiplexing circuit comprises M multiplexing sub-circuits, and an $n^{th}$ multiplexing control line comprises M control lines, and wherein an $m^{th}$ multiplexing sub-circuit comprised in the $n^{th}$ multiplexing circuit is electrically coupled to an $m^{th}$ control line in the $n^{th}$ multiplexing control line, an $m^{th}$ data voltage providing end and a corresponding data line, and configured to write a data voltage provided by the $m^{th}$ data voltage providing end into the corresponding data line under the control of a control signal provided by the $m^{th}$ control line, where N and M are both integers greater than 1, n is a positive integer smaller than or equal to N, and m is a positive integer smaller than or equal to M.

7. The display device according to claim 6, wherein:

the multiplexer circuit comprises a first multiplexing control line, a second multiplexing control line, a first multiplexing circuit and a second multiplexing circuit;

the first multiplexing control line comprises a first control line and a second control line, and the second multiplexing control line comprises a third control line and a fourth control line;

the first multiplexing circuit comprises a first multiplexing sub-circuit and a second multiplexing sub-circuit, and the second multiplexing circuit comprises a third multiplexing sub-circuit and a fourth multiplexing sub-circuit;

the first multiplexing sub-circuit is electrically coupled to the first control line, a first data voltage providing end and a first data line, and configured to write a data voltage provided by the first data voltage providing end into the first data line under the control of a first control signal provided by the first control line;

the second multiplexing sub-circuit is electrically coupled to the second control line, a second data voltage providing end and a second data line, and configured to write a data voltage provided by the second data voltage providing end into the second data line under the control of a second control signal provided by the second control line;

the third multiplexing sub-circuit is electrically coupled to the third control line, the first data voltage providing end and a third data line, and configured to write the data voltage provided by the first data voltage providing end into the third data line under the control of a third control signal provided by the third control line; and the fourth multiplexing sub-circuit is electrically coupled to the fourth control line, the second data voltage providing end and a fourth data line, and configured to write the data voltage provided by the second data voltage providing end into the fourth data line under the control of a fourth control signal provided by the fourth control line.

8. The display device according to claim 7, wherein:

the first multiplexing sub-circuit comprises a first transistor, and the second multiplexing sub-circuit comprises a second transistor;

a gate electrode of the first transistor is electrically coupled to the first control line, a first electrode of the first transistor is electrically coupled to the first data voltage providing end, and a second electrode of the first transistor is electrically coupled to the first data line; and a gate electrode of the second transistor is electrically coupled to the second control line, a first electrode of the second transistor is electrically coupled to the second data voltage providing end, and a second electrode of the second transistor is electrically coupled to the second data line.

9. The display device according to claim 8, wherein the first transistor and the second transistor are n-type transistors, or the first transistor and the second transistor are p-type transistors.

10. The display device according to claim 7, wherein:

the third multiplexing sub-circuit comprises a third transistor, and the fourth multiplexing sub-circuit comprises a fourth transistor;

a gate electrode of the third transistor is electrically coupled to the third control line, a first electrode of the third transistor is electrically coupled to the first data voltage providing end, and a second electrode of the third transistor is electrically coupled to the third data line; and a gate electrode of the fourth transistor is electrically coupled to the fourth control line, a first electrode of the fourth transistor is electrically coupled to the second data voltage providing end, and a second electrode of the fourth transistor is electrically coupled to the fourth data line.

11. The display device according to claim 10, wherein the third transistor and the fourth transistor are n-type transistors; or the third transistor and the fourth transistor are p-type transistors.

12. A display device, comprising a display panel, at least two data drivers, a plurality of control lines, a plurality of data lines, and a multiplexing module, wherein:

the multiplexing module comprises a plurality of multiplexer circuits, the data driver is configured to provide a data voltage to the multiplexing module through a data voltage providing end, and each of the data lines is configured to receive a data voltage provided by the multiplexing module;

the data drivers are arranged at a first side of the display panel, the plurality of control lines are arranged between the data drivers and an active display region of the display panel;

the data drivers are further configured to provide a control signal to be inputted into the control lines; and each control line is electrically coupled to the at least two data drivers through at least three access points, and configured to receive the control signal provided by the data drivers.

13. The display device according to claim 12, wherein the data drivers provide a control signal for each control line through at least one corresponding output channel.

14. The display device according to claim 13, wherein:

the display device comprises a first data driver and a second data driver;

a first output channel of the first data driver is electrically coupled to a first end of the control line, and a first output channel of the second data driver is electrically coupled to a second end of the control line;

a second output channel of the first data driver and a second output channel of the second data driver are electrically coupled to an intermediate node of the control line;

the first data driver is configured to provide the control signal for the control line through the first output channel and the second output channel; and the second data driver is configured to provide the control signal for the control line through the first output channel and the second output channel.

15. The display device according to claim 12, wherein each multiplexer circuit is electrically coupled to M data voltage providing ends and a plurality of data lines, the multiplexer circuit comprises N multiplexing control lines and N multiplexing circuits, an $n^{th}$ multiplexing circuit comprises M multiplexing sub-circuits, and an $n^{th}$ multiplexing control line comprises M control lines, and wherein an $m^{th}$ multiplexing sub-circuit comprised in the $n^{th}$ multiplexing circuit is electrically coupled to an $m^{th}$ control line in the $n^{th}$ multiplexing control line, an $m^{th}$ data voltage providing end and a corresponding data line, and configured to write a data voltage provided by the $m^{th}$ data voltage providing end into the corresponding data line under the control of a control signal provided by the $m^{th}$ control line, where N and M are both integers greater than 1, n is a positive integer smaller than or equal to N, and m is a positive integer smaller than or equal to M.

16. The display device according to claim 15, wherein:

the multiplexer circuit comprises a first multiplexing control line, a second multiplexing control line, a first multiplexing circuit and a second multiplexing circuit;

the first multiplexing control line comprises a first control line and a second control line, and the second multiplexing control line comprises a third control line and a fourth control line;

the first multiplexing circuit comprises a first multiplexing sub-circuit and a second multiplexing sub-circuit, and the second multiplexing circuit comprises a third multiplexing sub-circuit and a fourth multiplexing sub-circuit;

the first multiplexing sub-circuit is electrically coupled to the first control line, a first data voltage providing end and a first data line, and configured to write a data voltage provided by the first data voltage providing end into the first data line under the control of a first control signal provided by the first control line;

the second multiplexing sub-circuit is electrically coupled to the second control line, a second data voltage providing end and a second data line, and configured to write a data voltage provided by the second data voltage providing end into the second data line under the control of a second control signal provided by the second control line;

the third multiplexing sub-circuit is electrically coupled to the third control line, the first data voltage providing end and a third data line, and configured to write the data voltage provided by the first data voltage providing end into the third data line under the control of a third control signal provided by the third control line; and the fourth multiplexing sub-circuit is electrically coupled to the fourth control line, the second data voltage providing end and a fourth data line, and configured to write the data voltage provided by the second data voltage providing end into the fourth data line under the control of a fourth control signal provided by the fourth control line.

17. The display device according to claim 16, wherein:

the first multiplexing sub-circuit comprises a first transistor, and the second multiplexing sub-circuit comprises a second transistor;

a gate electrode of the first transistor is electrically coupled to the first control line, a first electrode of the first transistor is electrically coupled to the first data voltage providing end, and a second electrode of the first transistor is electrically coupled to the first data line; and a gate electrode of the second transistor is electrically coupled to the second control line, a first electrode of the second transistor is electrically coupled to the second data voltage providing end, and a second electrode of the second transistor is electrically coupled to the second data line.

18. The display device according to claim 17, wherein the first transistor and the second transistor are n-type transistors, or the first transistor and the second transistor are p-type transistors.

19. The display device according to claim 16, wherein:

the third multiplexing sub-circuit comprises a third transistor, and the fourth multiplexing sub-circuit comprises a fourth transistor;

a gate electrode of the third transistor is electrically coupled to the third control line, a first electrode of the third transistor is electrically coupled to the first data voltage providing end, and a second electrode of the third transistor is electrically coupled to the third data line; and a gate electrode of the fourth transistor is electrically coupled to the fourth control line, a first electrode of the fourth transistor is electrically coupled to the second data voltage providing end, and a second electrode of the fourth transistor is electrically coupled to the fourth data line.

20. The display device according to claim 19, wherein the third transistor and the fourth transistor are n-type transistors; or the third transistor and the fourth transistor are p-type transistors.

* * * * *